United States Patent

Iino et al.

[11] Patent Number: 5,803,856
[45] Date of Patent: Sep. 8, 1998

[54] HYDRAULIC/MECHANICAL POWER TRANSMITTING SYSTEM

[75] Inventors: Takashi Iino; Mikihiro Takano, both of Wako, Japan

[73] Assignee: Honda Giken Kogyo Kabushiki Kaisha, Tokyo, Japan

[21] Appl. No.: 803,143

[22] Filed: Feb. 19, 1997

[30] Foreign Application Priority Data

Feb. 22, 1996 [JP] Japan .................................. 8-034524

[51] Int. Cl.⁶ ........................................................ F16H 3/72
[52] U.S. Cl. ........................... 475/72; 475/82; 74/730.1
[58] Field of Search ................................ 475/72, 73, 78, 475/80, 82; 74/730.1, 732.1

[56] References Cited

U.S. PATENT DOCUMENTS

| | | | |
|---|---|---|---|
| 3,969,957 | 7/1976 | DeLalio | 475/82 X |
| 3,990,327 | 11/1976 | Margolin | 475/80 |
| 4,563,914 | 1/1986 | Miller | 475/80 |
| 5,002,521 | 3/1991 | Schwarz et al. | 475/72 |
| 5,299,985 | 4/1994 | Johnston | 475/72 X |
| 5,542,307 | 8/1996 | Hasegawa et al. | 74/730.1 X |
| 5,544,547 | 8/1996 | Ishimaru | 74/730.1 |
| 5,643,122 | 7/1997 | Fredriksen | 475/80 |
| 5,695,422 | 12/1997 | Otten | 475/72 |

*Primary Examiner*—Charles A. Marmor
*Assistant Examiner*—Peter T. Kwon
*Attorney, Agent, or Firm*—Nikaido, Marmelstein, Murray & Oram LLP

[57] ABSTRACT

In a hydraulic/mechanical transmitting system, an input shaft of a power dividing device and a power collecting shaft coupled to a motor cylinder are disposed coaxially with each other. The power dividing device includes a first output member which is carried on an outer periphery of the power collecting shaft and operatively connected to a pump shaft parallel to the power collecting shaft, and a second output shaft which is fixedly mounted on the power collecting shaft. Thus, the number of the parallel shafts can be decreased to provide a simplified and compact structure.

4 Claims, 5 Drawing Sheets

HYDRAULIC/MECHANICAL POWER TRANSMITTING SYSTEM

BACKGROUND OF THE INVENTION

1. Field of the Invention:

The present invention relates to a hydraulic/mechanical power transmitting system which includes a power dividing device having an input shaft and first and second output members and which is adapted divide power from a prime mover or motor to the input shaft to distribute power to both the output members. A hydrostatic continuously variable transmission having a hydraulic pump is driven by the power distributed to the first output member, and a hydraulic motor communicates with the hydraulic pump through a hydraulic closed circuit. A control plate has the hydraulic closed circuit. A power collecting shaft collects the power outputted from the hydraulic motor and the power distributed to the second output member to supply them to a loading member.

2. Description of the Related Art:

Hydraulic/mechanical power transmitting systems, including the hydraulic pump and the hydraulic motor which communicate with each other through the hydraulic closed circuit, and at least one of which is formed into a variable-displacement type, have been used in a variety of industrial machines and vehicles. Such hydraulic/mechanical power transmitting systems are adequate during continuous speed change, but are often inefficient with respect to power transmitting efficiency and are unsuitable for an automotive vehicle in which fuel consumption is a serious consideration.

Therefore, a hydraulic/mechanical power transmitting system has been already proposed wherein power from a prime mover is transmitted under cooperation of a hydrostatic continuously variable transmission having an excellent continuous speed-change property and a mechanical power transmitting device having an excellent transmitting efficiency in order to improve the transmitting efficiency (see, for example, Japanese Patent Application Laid-open No. 62-147148). In such hydraulic/mechanical power transmitting systems, an enhancement in transmitting efficiency can be provided, while maintaining the continuous speed-change property of the hydrostatic continuously variable transmission.

However, the hydraulic/mechanical power transmitting system discussed above has a disadvantage in that a large number of shafts, including an input shaft to which the power from the prime mover is supplied, a pump shaft of a hydraulic pump, a motor shaft of a hydraulic motor, and a power collecting shaft for collecting power components distributed to a hydraulic section and a mechanical section in a divided manner, are disposed independently in parallel to one another. This large number of parallel shafts results in a complicated and large-sized structure.

SUMMARY OF THE INVENTION

Accordingly, it is an object of the present invention to provide a hydraulic/mechanical transmitting system including a decreased number of parallel shafts and having a simple and compact structure.

To achieve the above object, according to a first aspect and feature of the present invention, a hydraulic/mechanical power transmitting system includes a power dividing device having an input shaft and first and second output members which are configured to divide power supplied from a prime mover to the input shaft, to distribute power to both of the output members. A hydrostatic continuously variable transmission is provided, and has a hydraulic pump driven by the power distributed to the first output member, a hydraulic motor communicating with the hydraulic pump through a hydraulic closed circuit, and a control plate having the hydraulic closed circuit. At least one of said hydraulic pump and said hydraulic motor is formed of a variable-displacement type. A power collecting shaft is provided for collecting the power outputted from the hydraulic motor and the power distributed to the second output member to supply them to a loading member. The input shaft and the power collecting shaft are disposed coaxially with each other. The first output shaft is relatively rotatably disposed on the power collecting shaft, and is connected through an interlocking device to a pump shaft disposed parallel to the power collecting shaft. The second output member is fixedly mounted on the power collecting shaft. The hydraulic pump has a pump cylinder which is coupled to the pump shaft for rotation in unison with the pump shaft. The hydraulic motor has a motor cylinder which is coupled to the power collecting shaft for rotation in unison with the power collecting shaft.

With the first feature of the present invention, the power collecting shaft, disposed coaxially with the input shaft, also serves as a motor shaft. Therefore, the number of parallel shafts can be substantially decreased to provide a simplified and compact structure.

According to a second aspect and feature of the present invention, in addition to the first feature, the control plate of the hydrostatic continuously variable transmission is disposed adjacent a mechanical transmitting unit which includes the power dividing device and the interlocking device. Intermediate portions of the power collecting shaft and the pump shaft are carried on the control plate.

With the second feature of the present invention, the intermediate portions of both the power collecting shaft and the pump shaft can be simply supported utilizing the control plate, whereby a flexing of both the relatively long shafts can be effectively inhibited.

According to a third aspect and feature of the present invention, in addition to the second feature, a lock-up device capable of properly fixing the pump shaft is disposed on the side opposite from the control plate with the mechanical transmitting unit interposed therebetween.

With the third feature of the present invention, the inter-axis distance between the power collecting shaft and the pump shaft can be set at a smaller value, thereby increasing the capacity of the lock-up device, while providing a reduced size of the power transmitting system.

According to a fourth aspect and feature of the present invention, in addition to the third feature, a replenishing pump is disposed radially adjacent the lock-up device and driven by the input shaft for replenishing a working oil or fluid to the hydraulic closed circuit.

With the fourth feature of the present invention, the replenishing pump and the lock-up device fill a radially one-side dead space cooperatively, which can also contribute to reducing the size of the power transmitting system.

BRIEF DESCRIPTION OF THE DRAWINGS

For a more clear understanding of the various aspects of the invention, reference can be made to the appended drawings, wherein.

DETAILED DESCRIPTION OF THE PREFERRED EMBODIMENT

Figure 1:
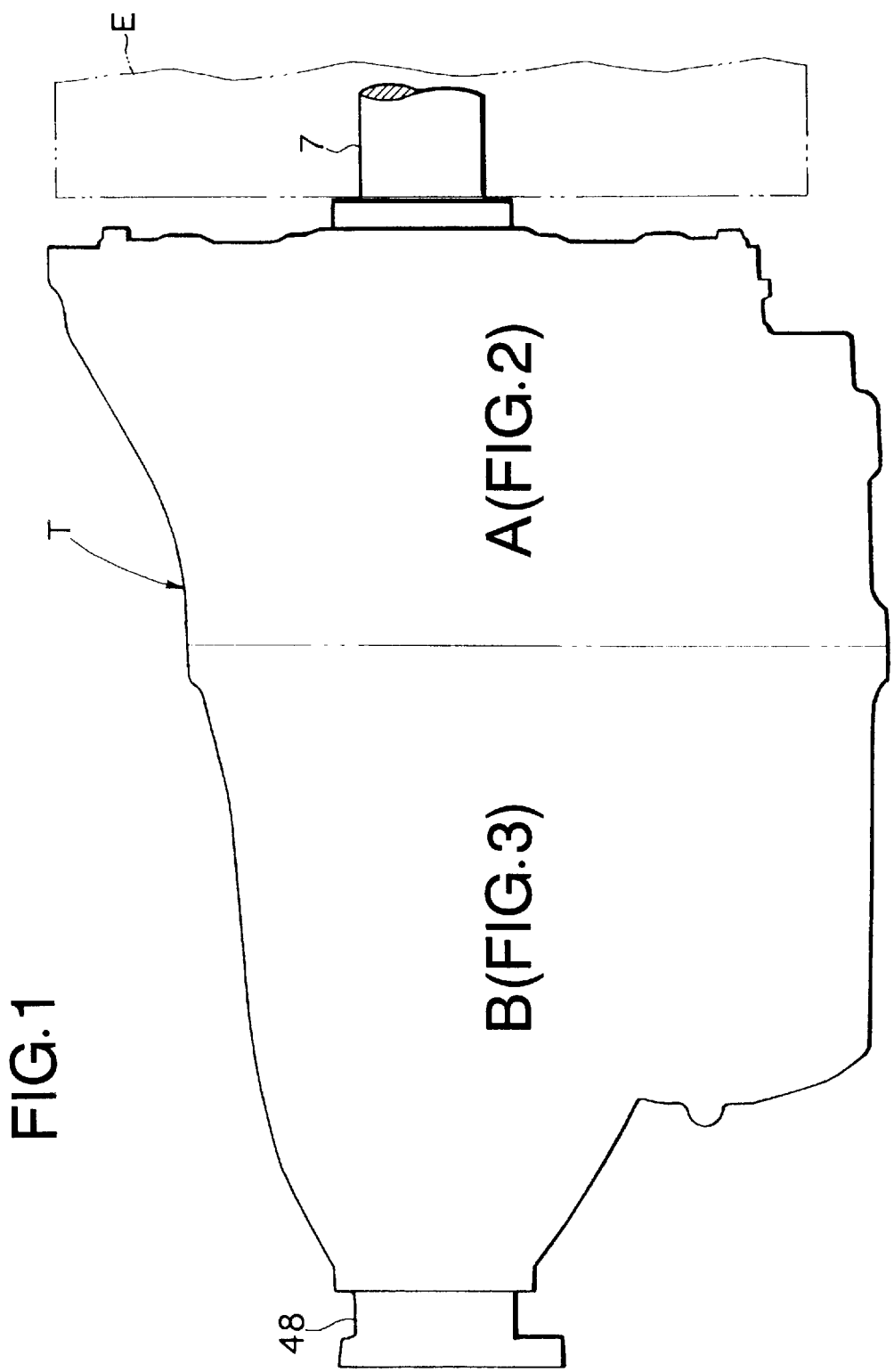
FIG. 1 is a side view of the entire arrangement of a hydraulic/mechanical power transmitting system according to one embodiment of the present invention.
Figure 2:
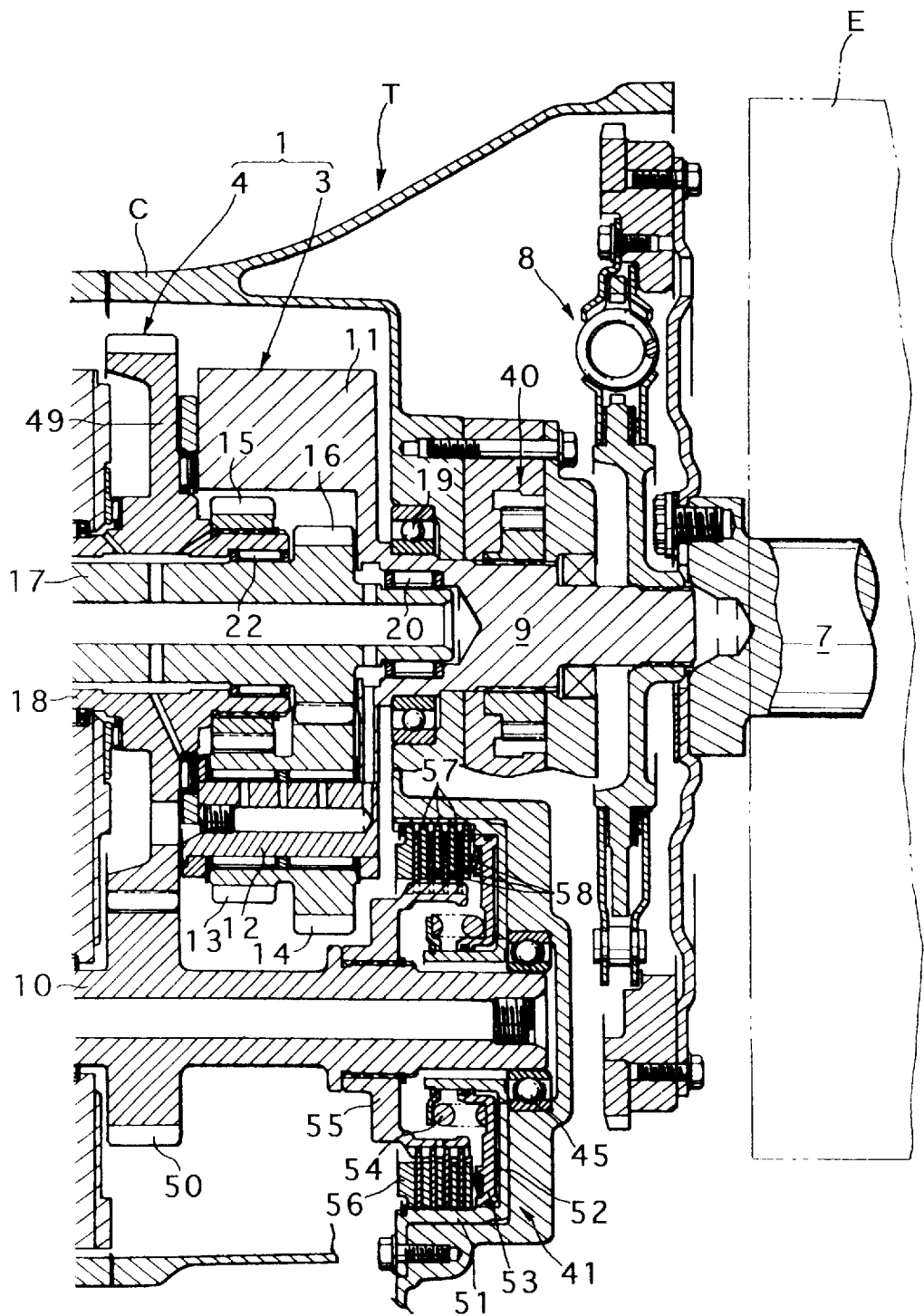
FIG. 2 is an enlarged sectional view of a portion A of the mechanical transmitting unit shown in FIG. 1.
Figure 3:
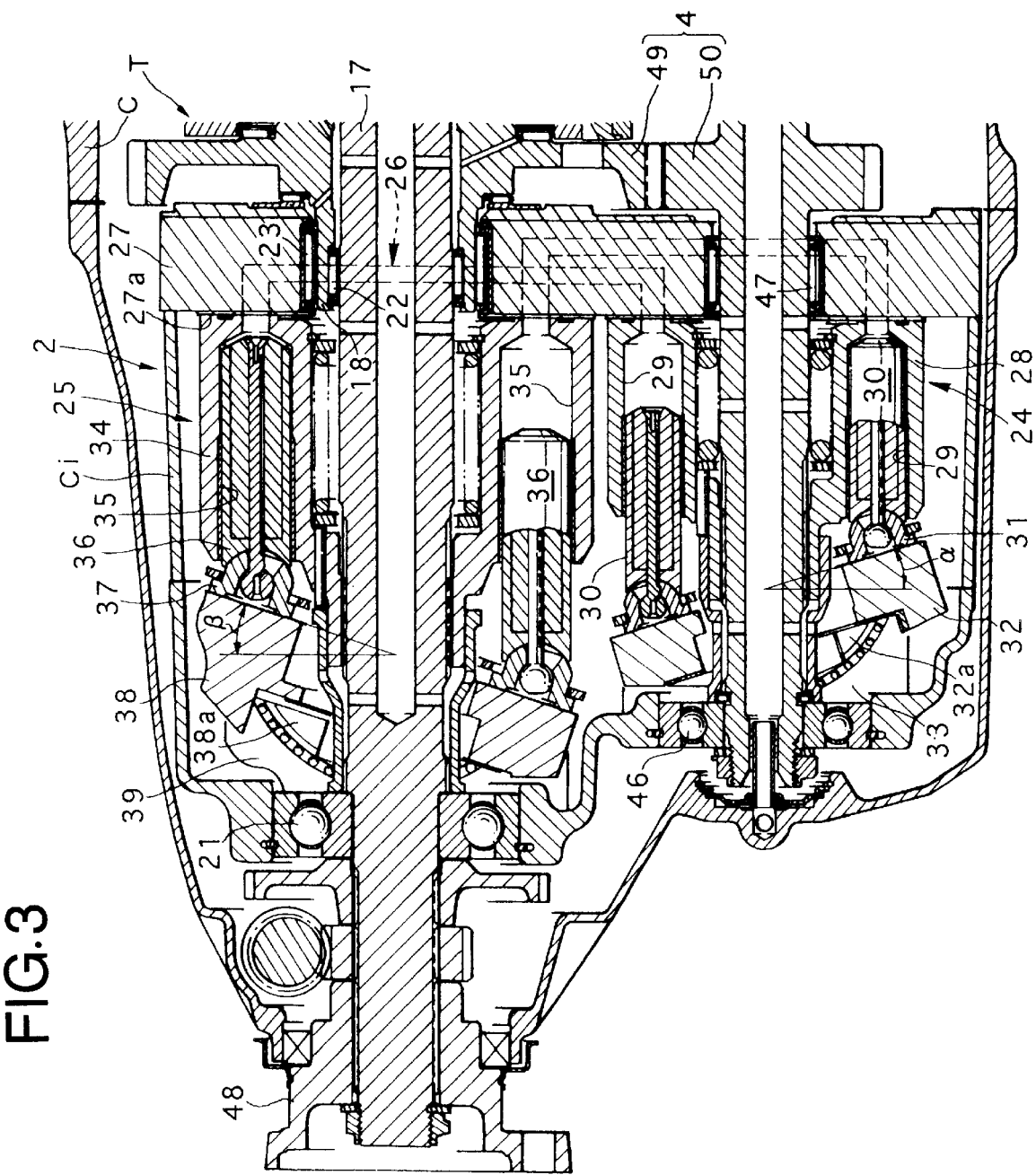
FIG. 3 is an enlarged sectional view of a portion B of the variable transmission unit shown in FIG. 1.
Figure 4:
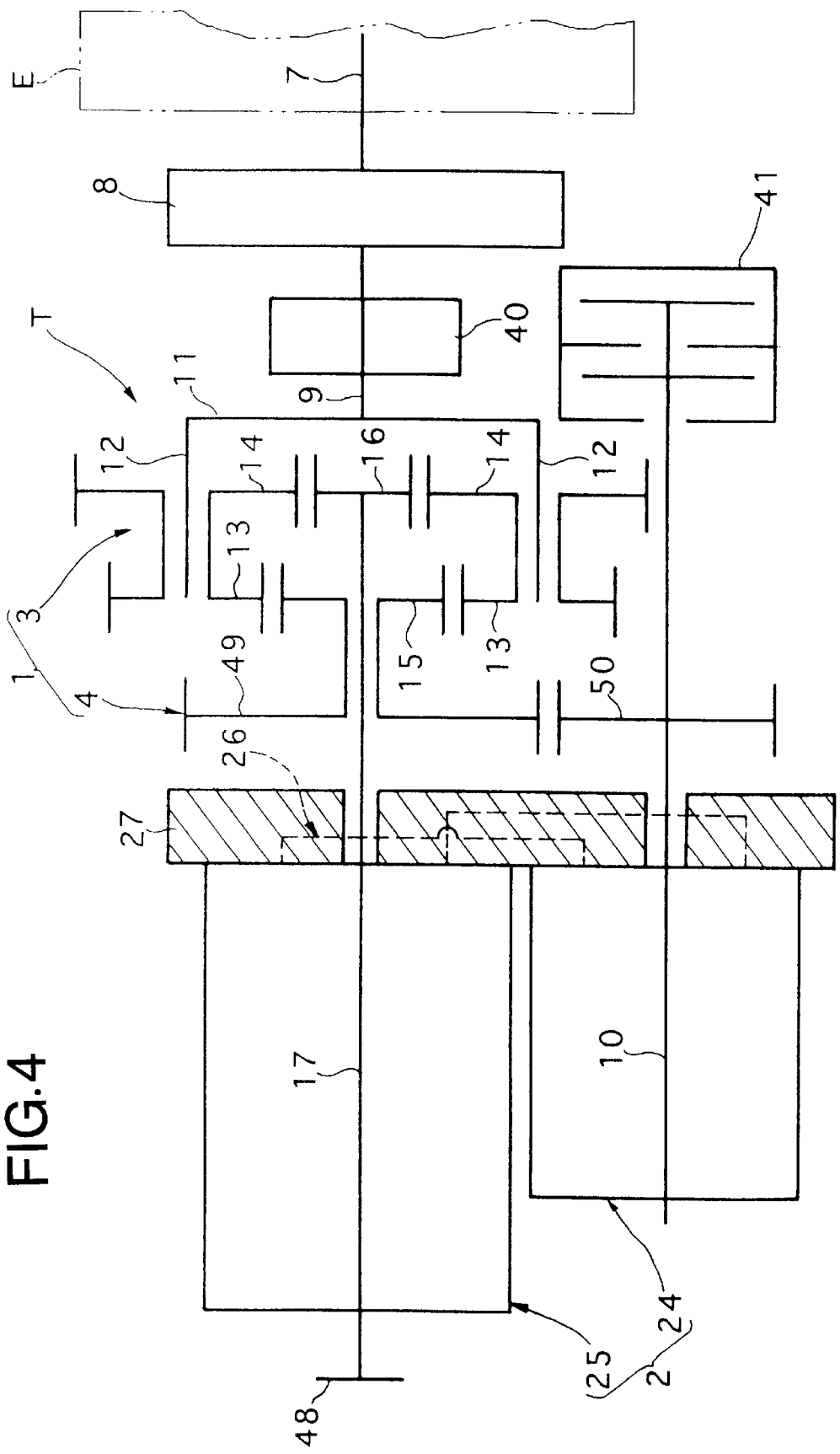
FIG. 4 is diagrammatic illustration of a transmitting section of the transmitting system.

Referring to FIGS. 1 to 4, hydraulic/mechanical power transmitting system T is comprised of a mechanical transmitting unit 1 and a hydrostatic continuously variable transmission 2. An engine E as a prime mover and the continuously variable transmission 2 are disposed in front and in rear of the mechanical transmitting unit 1, respectively, such as on opposite sides of the mechanical transmitting unit 1 and accommodated in a transmission case C. The continuously variable transmission 2 includes a hydraulic pump 24 and a hydraulic motor 25 which are accommodated in an inner case Ci which is disposed within the transmission case C. The continuously variable transmission 2 further includes a control plate 27 which is coupled to an opened end face of the inner case Ci adjacent the mechanical transmitting unit 1, to thereby close the opened end face.

The hydraulic/mechanical power transmitting unit 1 includes an input shaft 9 connected to a crankshaft 7 of the engine E through a torque damper 8, a power collecting shaft 17 disposed coaxially with the input shaft 9, an intermediate shaft 18 disposed concentrically with the power collecting shaft 17 to surround the collecting shaft, and a pump shaft 10 disposed parallel to the power collecting shaft 17. The input shaft 9 is carried on a front end wall of the transmission case C with a ball bearing 19 disposed therebetween. The power collecting shaft 17 is carried at its front end on the input shaft 9 with a needle bearing 20 disposed therebetween and at its rear end on a rear end wall of the inner case Ci with a ball bearing 21 disposed therebetween. The intermediate shaft 18 is carried at its front and rear opposite ends on an outer periphery of the power collecting shaft 17 with needle bearings 22, 22 disposed therebetween and also at the rear end thereof on the control plate 27 with a needle bearing 23. Thus, the intermediate portion of the power collecting shaft 17 is carried on the control plate 27 with the intermediate shaft 18 disposed therebetween. The pump shaft 10 is carried at its front end on the front end wall of the transmission case C with a ball bearing 45 interposed therebetween. The rear end of the pump shaft is supported on the rear end wall of the inner case Ci with a ball bearing 46, and is also supported at its intermediate portion on the control plate 27 with a needle bearing 47.

A coupling member 48 is secured to the rear end of the power collecting shaft 17 and protrudes outwards from the rear end wall of the transmission case C, and a propeller shaft (not shown), connected to driven wheels of a vehicle, is connected to the coupling member 48.

The mechanical transmitting unit 1 includes a power dividing device 3 for distributing power supplied from the engine E to the power collecting shaft 17 and the intermediate shaft 18, and an interlocking device 4 adapted to transmit the power distributed to the intermediate shaft 18 to the pump shaft 10.

The power dividing device 3 has a planetary gear configuration, and includes a carrier 11 fixedly mounted on the input shaft 9, a pair of pinion gears 13 and 14 of different diameters which are rotatably carried on a pinion shaft 12 parallel to the input shaft 9 of the carrier 11 and integrally connected to each other, and a pair of first and second sun gears 15 and 16 of larger and smaller diameters (first and second outputting members) meshed with the pinion gears 13 and 14, respectively, and arranged coaxially with the input shaft 9. The first, larger-diameter sun gear 15 is spline-coupled to the intermediate shaft 18, and the second smaller-diameter sun gear 16 is integrally formed on the power collecting shaft 17. In this case, the second sun gear 16 is disposed so that it is sandwiched between the input shaft 9 and the first sun gear 15.

The interlocking device 4 includes a larger-diameter gear 49 integrally formed at the intermediate portion of the intermediate shaft 18, and a smaller-diameter gear 50 integrally formed on the pump shaft 10 and meshed with the larger-diameter gear 49. The interlocking device 4 is disposed so that it is sandwiched between the power dividing device 3 and the control plate 27.

The continuously variable transmission 2 includes the hydraulic pump 24, the hydraulic motor 25 and the control plate 27 having a hydraulic closed circuit 26 which permits the communication between the hydraulic pump 24 and the hydraulic motor 25.

The hydraulic pump 24 is a variable displacement type pump and includes a pump cylinder 28 spline-coupled to the pump shaft 10 and rotatably and slidably disposed on a hydraulic pressure distributing surface 27a of the control plate 27, a large number of pump plungers 30 slidably received in a large number of annularly arranged cylinder bores 29 which are provided in the pump cylinder 28 to surround an axis of the pump cylinder 28, and a pump swash plate 32 which can be varied in angle, against which a shoe 31, oscillatably mounted to a tip end of each of the pump plungers 30, slidably abuts. More specifically, the pump swash plate 32 has a semi-cylindrical trunnion shaft 32a which is rotatably carried on a pump swash plate anchor 33 fixed to the inner case Ci. Thus, the pump swash plate 32 enables the reciprocating stroke of each of the pump plungers 30 to be increased and decreased depending upon an increase and decrease in angle (of inclination from an upright position perpendicular to an axis of the trunnion shaft 32a.

Hydraulic motor 25 is a variable displacement type motor, and includes a motor cylinder 34 spline-coupled to the power collecting shaft 17 and rotatably and slidably disposed on the hydraulic pressure distributing surface 27a of the control plate 27. A large number of motor plungers 36 are slidably received in a large number of annularly arranged cylinder bores 35 which are provided in the motor cylinder 34 to surround an axis of the motor cylinder 34, and a motor swash plate 38 is provided, which can be varied in angle, against which a shoe 37, oscillatably mounted to a tip end of each of the motor plungers 36, slidably abuts. More specifically, the motor swash plate 38 has a semi-cylindrical trunnion shaft 38a which is rotatably carried on a motor swash plate anchor 39 secured to the inner case Ci. Thus, the motor swash plate 38 enables the reciprocating stroke of each of the pump plungers 36 to be increased and decreased depending upon an increase and decrease in angle β of inclination from an upright position perpendicular to an axis of the trunnion shaft 38a.

A replenishing pump 40, for replenishing an amount of a working oil corresponding to an amount of oil communicated to the hydraulic closed circuit 26, is mounted to an outer surface of the front end wall of the transmission case C so that it is driven by the input shaft 9.

A lock-up device 41, capable of properly locking up the pump shaft 10 by utilizing a hydraulic pressure discharged from the replenishing pump 40, is formed between the front end wall of the transmission case C and the pump shaft 10. Lock-up device 41 is disposed in a manner that it sandwiches a portion of each of the power dividing device 3 and the interlocking device 4 between the lock-up device 41 and the control plate 27 and in a manner that it is radially adjacent the replenishing pump 40.

The lock-up device 41 is comprised of a partial cylinder 51 secured to the front end wall of the transmission case C to surround an end of the pump shaft 10, with a piston 53 received in the cylinder 51 to define a hydraulic pressure chamber 52 between the piston 53 and an end wall of the cylinder 51. A return spring 54 is provided for biasing the piston 53 toward the hydraulic pressure chamber 52, and a cylindrical lock-up center 55 is spline-coupled to the pump shaft 10 within the cylinder 51. A pressure receiving plate 56 is disposed at en open end of the cylinder 51, and a plurality of outer friction plates 57 slidably spline-coupled to an inner periphery of the cylinder 51 between the piston 53 and the pressure receiving plate 56. A plurality of inner friction plates 58 are also slidably spline-coupled to an outer periphery of the lock-up center 55 between the piston 53 and the pressure receiving plate 56 and placed alternately with the outer friction plates 57. Therefore, if a hydraulic pressure discharged from the replenishing pump 40 is supplied through a control valve (not shown) to the hydraulic pressure chamber 52, the piston 53 can be operated toward the pressure receiving plate 56 to clamp the inner and outer friction plates 57 and 58, thereby bringing these friction plates 57 and 58 into engagement to brake and lock the pump shaft 10 through the lock-up center 55. A reaction force to the braking at this time is received by the front end wall of the transmission case C through the cylinder 51.

When a power from the engine E is supplied from the crankshaft 7 through the torque damper 8 to the input shaft 9, the power is distributed to the pinion gears 13 and 14 of the different diameters via the pinion shaft 12 of the carrier 11. The power distributed to the smaller-diameter pinion gear 13 is transmitted from the first larger-diameter sun gear 15 via the intermediate shaft 18 and the interlocking device 4 to the pump shaft 10. Therefore, if the lock-up device 41 is in a non-operated state, the pump cylinder 28 in the hydraulic pump 24 is rotated by the pump shaft 10. If each of the pump swash plate 32 and the motor swash plate 38 is in a state in which it has been inclined at a suitable angle from the upright position, the pump plunger 30 is moved in one reciprocation for every rotation of the pump cylinder 28 within the cylinder bore 29 with a stroke corresponding to the inclination angle a of the pump swash plate 32 to perform discharging and drawing motions. In this configuration, the pressurized fluid discharged from each of the cylinder bores 29 is supplied via a high-pressure side of the hydraulic closed circuit 26 of the control plate 27 to the corresponding cylinder bore 35 of the motor cylinder 34, to provide an expanding motion to the corresponding motor plunger 36. When the plunger 36 urges the motor swash plate 38, a component of a resulting reaction force in a rotational direction rotates the motor cylinder 34 through the plunger 36 to transmit a resulting power to the power collecting shaft 17. Then, the motor plunger 36 which has finished the expanding motion is now contracted by the motor swash plate 38, whereby the fluid discharged from the corresponding cylinder bore 35 is drawn via a lower-pressure side of the hydraulic closed circuit 26 into the cylinder bore 29 of the pump plunger 30 which performs the drawing motion. In this manner, in the hydraulic motor 25, the motor plunger 36 is reciprocally moved with a stroke corresponding to the inclination angle $\beta$ of the motor swash plate 38, and the motor cylinder 34 is rotated in one rotation along with the power collection shaft 17 for one reciprocation of the motor plunger 36.

The displacement of each of the hydraulic pump 24 and the hydraulic motor 25 depends upon the stroke of the corresponding plunger 30, 36, the angle $\alpha$, $\beta$ of the swash plate 32, 38 and hence, the speed ratio of the continuously variable transmission 2 can be continuously varied by changing the angle $\alpha$, $\beta$ of each of the swash plates 32 and 38.

On the other hand, the power distributed to the larger-diameter pinion gear 14 is supplied from the second smaller-diameter sun gear 16 directly to the power collecting shaft 17 to drive the power collecting shaft 17.

In this way, one of the power components resulting from dividing of the engine power by the power dividing device 3 is changed in transmission speed by the hydrostatic continuously variable transmission 2 and then transmitted directly to the power collecting shaft 17, and the other power component is transmitted directly to the power collecting shaft 17. Therefore, the transmission of the power can be performed while satisfying both performance of the continuous speed-change and the transmitting efficiency. The power components which are combined in the power collecting shaft 17 are transmitted through the coupling member 48 to the propeller shaft (not shown) to drive the driven wheels of the vehicle.

The relationship between the inclination angle $\alpha,\beta$ of each of the swash plates 32 and 38 and the total speed ratio in the hydraulic/mechanical power transmitting system T will now be described, with reference to FIG. 5.

Figure 5:
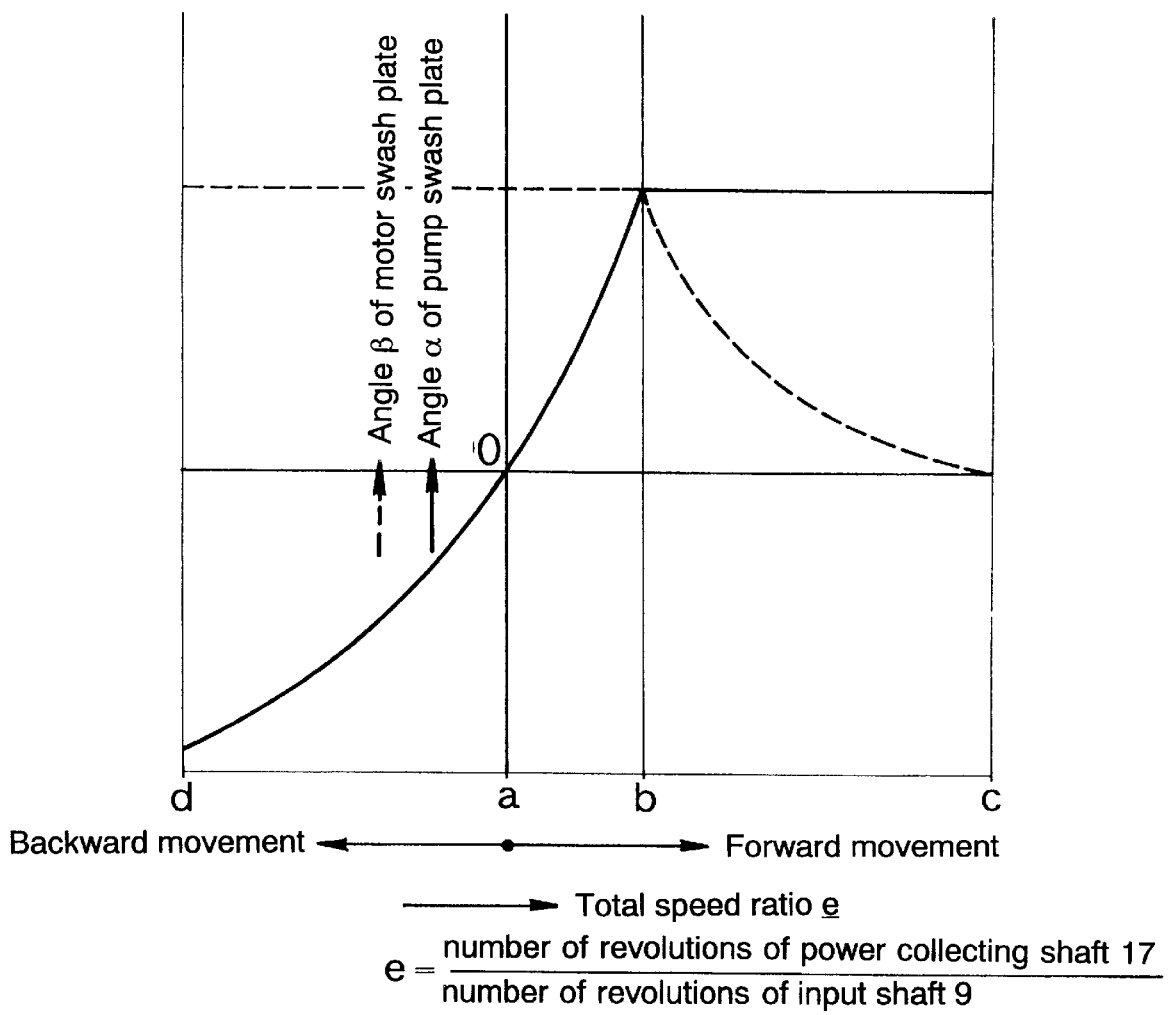
FIG. 5 is a diagram illustrating the relationship between the angles of swash plates and the total speed ratio of a hydrostatic continuously variable transmission in the transmitting system.

In a diagram in FIG. 5, the total speed ratio e is taken on the axis of the abscissas, and the inclination angles $\alpha$ and $\beta$ of the swash plates 32 and 38 are taken on the axis of the ordinate.

(1) When total speed ratio e=a

This situation occurs when the pump swash plate 32 has been controlled to satisfy $\alpha=0$, and the motor swash plate 38 has been controlled to satisfy $\beta=\beta max$. By satisfying $\alpha=0$, the displacement of the hydraulic pump 24 becomes zero; therefore, even if the pump cylinder 28 is driven from the pump shaft 10, the pump plunger 30 is not stroked, so that no hydraulic pressure can be generated in the hydraulic closed circuit 26 and as a result, the hydraulic motor 25 is not operated. Therefore, the power of the engine E supplied to the input shaft 9 is completely expended for the driving of the substantially non-load pump cylinder 28, so that the power collecting shaft 17 is not rotated. As a result, the total speed ratio e is equal to 0, so the reduction ratio is considered to be infinite.

(2) When total speed ratio e=a–b

This situation occurs in a range in which the angle a of the pump swash plate 32 is gradually increased to $\alpha max$, while the angle $\beta$ of the motor swash plate 38 remains maintained at $\beta max$. That is, the displacement of the hydraulic pump 24 is increased with an increase in angle $\alpha$. In response to this, the hydraulic motor 25 is operated, and the transmission of the power to the power collecting shaft 17 is started. As a result, the total speed ratio e is increased.

(3) When total speed ratio e=b–c

This situation occurs in a range in which the angle $\beta$ of the motor swash plate 38 is gradually decreased from $\beta max$ to 0, while the angle a of the pump swash plate 32 remains maintained at αmax. The displacement of the hydraulic motor 25 is decreased in accordance with a decrease in angle β and hence, the rotational speed of the pump cylinder 28 is gradually decreased by an increase in load to the hydraulic pump 24, and when β=0, the rotation of the pump cylinder 28 is stopped. On the contrary, the rotational speed of the power collecting shaft 17 is gradually increased, and therefore the total speed ratio e become maximum when β=0. That is, the power is transmitted substantially only by the mechanical transmitting unit 1.

If the lock-up device 41 is operated at this time, the pump shaft 10 can be mechanically secured; therefore, a hydraulic pressure need not be generated in the hydraulic closed circuit 26. Thus, it is possible to prevent a power loss due to the leakage of the hydraulic pressure from the hydraulic closed circuit 26.

(4) When total speed ratio e=a−d

This situation occurs in a range in which the angle β of the motor swash plate 38 is gradually decreased from βmax to 0, while the pump swash plate 32 is tilted from α=0 in a negative direction, i.e., from the upright position in a direction opposite from that during forward movement of the vehicle. In this range, the direction of hydraulic pressure discharged from the hydraulic pump 24 to the hydraulic closed circuit 26 is reversed; therefore, the high-pressure and low-pressure sides in the hydraulic closed circuit are reversed from the state provided during forward movement of the vehicle. Therefore, the motor cylinder 34 can be reversely rotated to reversely rotate the power collecting shaft 17.

In a hydraulic/mechanical power transmitting system T, the input shaft 9 and the power collecting shaft 17 are disposed coaxially with each other, and the first sun gear 15 is fixedly mounted on the intermediate shaft 18 rotatably carried on the power collecting shaft 17. The intermediate shaft 18 is connected the pump shaft 10 parallel to the power collecting shaft 17 through the interlocking device 4, while the second sun gear 16 is fixedly mounted on the power collecting shaft 17. The pump cylinder 28 is spline-coupled to the pump shaft 10, and the motor cylinder 34 is spline-coupled to the power collecting shaft 17. Therefore, the power collecting shaft 17 disposed coaxially with the input shaft 9 can be also used as a motor shaft, thereby providing a substantially decreased number of all parallel shafts and a simplified and compact structure.

In addition, since the control plate 27 of the hydrostatic continuously variable transmission 2 is disposed adjacent the mechanical transmitting unit 1, and the intermediate portions of the power collecting shaft 17 and the pump shaft 10 are carried on the control plate 27, the intermediate portions of both the shafts 17 and 10 can be simply supported utilizing the control plate 27, and flexing of the shafts 17 and 10 can be effectively inhibited.

Since the lock-up device 41 is disposed in such a manner that the mechanical transmitting unit 1 is sandwiched between the lock-up device 41 and the control plate 27, the axis-axis distance between the power collecting shaft 17 and the pump shaft 10 can be set at a small value to increase the capacity of the lock-up device 41, while enabling overall size of the transmitting system T to be reduced.

Since the cylinder 51 of the lock-up device 41 is embedded and secured in the end wall of the transmission case C, the reaction force to the braking can be securely received by the end wall of the transmission case C and therefore, a stable braking force can be applied to the pump shaft 10.

Additionally, since the replenishing pump 40 driven by the input shaft 9, and the lock-up device 41, are radially adjacent each other, the replenishing pump 40 and the lock-up device 41 fill a radially one-sided dead space in the case, which also contributes to reducing the size of the transmitting system T.

Although the embodiments of the present invention have been described in detail, it will be understood that the present invention is not limited to the above-described embodiments, and various modifications in design may be made without departing from the spirit and scope of the invention defined in claims. For example, the power collecting shaft 17 may be carried directly on the control plate 27 without the intermediate shaft 18 being interposed therebetween. Either one of the hydraulic pump 24 and the hydraulic motor 25 may be a fixed displacement type by fixing the corresponding swash plate.

What is claimed is:

1. A hydraulic/mechanical power transmitting system, said system comprising:

a power dividing means having an input shaft and first and second output members, for dividing power supplied from a prime mover to the input shaft to distribute the power to the first and second output members;

a hydrostatic continuously variable transmission means connected to the power dividing means, and having a hydraulic pump driven by the power distributed to the first output member, for providing continuously variable drive power, said hydrostatic variable transmission means also having a hydraulic motor communicating with the hydraulic pump through a hydraulic closed circuit, and a control plate having the hydraulic closed circuit disposed thereupon, with at least one of said hydraulic pump and said hydraulic motor being of a variable- displacement type; and a power collecting shaft for collecting the power output from the hydraulic motor and the power distributed to the second output member and for supplying the power to a loading member, wherein said input shaft and said power collecting shaft are disposed coaxially with each other, said first output shaft being relatively rotatably disposed on said power collecting shaft and connected through an interlocking device to a pump shaft which disposed parallel to said power collecting shaft, wherein said second output member is fixedly mounted on said power collecting shaft, said hydraulic pump including a pump cylinder which is coupled to said pump shaft for rotation in unison with said pump shaft, and wherein said hydraulic motor includes a motor cylinder which is coupled to said power collecting shaft for rotation in unison with said power collecting shaft.

2. A hydraulic/mechanical power transmitting system according to claim 1, wherein said control plate of the hydrostatic continuously variable transmission means is disposed adjacent a mechanical transmitting means which includes said power dividing device and said interlocking device, and wherein intermediate portions of said power collecting shaft and said pump shaft are carried on said control plate.

3. A hydraulic/mechanical power transmitting system according to claim 2, further comprising a lock-up device which is capable of locking said pump shaft and which is disposed on a side of said mechanical transmitting means opposite from said control plate.

4. A hydraulic/mechanical power transmitting system according to claim 3, further comprising a replenishing pump which is disposed radially adjacent said lock-up device and driven by said input shaft for replenishing a working fluid communicated to said hydraulic closed circuit.

* * * * *